(12) United States Patent
Pedraza et al.

(10) Patent No.: US 9,121,152 B2
(45) Date of Patent: Sep. 1, 2015

(54) CANINE EXCREMENT COLLECTOR

(71) Applicants: Mario Hervas Pedraza, Ciudad Real (ES); José Gómez Ruiz, Ciudad Real (ES); Miguel Ángel Alcaide Mota, Ciudad Real (ES); Francisco José Sánchez Torres, Ciudad Real (ES); Miguel Sánchez Nieto, Ciudad Real (ES)

(72) Inventors: Mario Hervas Pedraza, Ciudad Real (ES); José Gómez Ruiz, Ciudad Real (ES); Miguel Ángel Alcaide Mota, Ciudad Real (ES); Francisco José Sánchez Torres, Ciudad Real (ES); Miguel Sánchez Nieto, Ciudad Real (ES)

( * ) Notice: Subject to any disclaimer, the term of this patent is extended or adjusted under 35 U.S.C. 154(b) by 0 days.

(21) Appl. No.: 14/398,977

(22) PCT Filed: May 4, 2013

(86) PCT No.: PCT/ES2013/070278
§ 371 (c)(1),
(2) Date: Nov. 5, 2014

(87) PCT Pub. No.: WO2013/167776
PCT Pub. Date: Nov. 14, 2013

(65) Prior Publication Data
US 2015/0137541 A1  May 21, 2015

(30) Foreign Application Priority Data
May 7, 2012 (ES) .............................. 201230492 U

(51) Int. Cl.
*A01K 29/00* (2006.01)
*E01H 1/12* (2006.01)
*A01K 27/00* (2006.01)

(52) U.S. Cl.
CPC ............ *E01H 1/1206* (2013.01); *A01K 27/004* (2013.01); *E01H 2001/1273* (2013.01); *E01H 2001/1293* (2013.01)

(58) Field of Classification Search
CPC ....... B25J 1/04; B25J 15/0009; E01H 1/1206; E01H 2001/1293; E01H 2001/1273; F24B 15/10; A63B 47/02; A01K 97/14; A01K 27/004; A01B 1/18; B25B 9/00; A01D 46/005; A01D 46/247; H01K 3/32
See application file for complete search history.

(56) References Cited

U.S. PATENT DOCUMENTS 2,616,741 A * 11/1952 Ziese .............................. 294/111
5,317,939 A * 6/1994 Marinescu .................. 81/53.11

(Continued)

FOREIGN PATENT DOCUMENTS

EP    2182119 A1    5/2010
ES    1033181 U    8/1996

(Continued)

*Primary Examiner* — Stephen Vu
(74) *Attorney, Agent, or Firm* — Ash Tankha; Lipton, Weinberger & Husick

(57) ABSTRACT

The canine excrement collector is a mechanical device for canine excrement collection. The canine excrement collector includes a telescopic mast with a handle and a walking leash on the upper end of the telescopic mast. The canine excrement collector further includes a trigger positioned at the upper end of the telescopic mast. The trigger is internally attached to a retractable pulley. The retractable pulley is connected to a cord whose free end extends longitudinally inside the telescopic mast, passing through a second pulley connected to a floating hexagonal piece, and reaching a fixed hexagonal piece located at a lower end of the telescopic mast.

7 Claims, 1 Drawing Sheet

(56) References Cited

U.S. PATENT DOCUMENTS 5,570,919 A 11/1996 Eusebe
7,334,171 B2 * 2/2008 Kanuma ........................ 714/724
7,992,907 B1 * 8/2011 DeJesus ........................ 294/1.4

2004/0135386 A1 7/2004 Pineda

FOREIGN PATENT DOCUMENTS

ES 2336414 A1 4/2010
NZ WO 2004077939 A1 9/2004

* cited by examiner

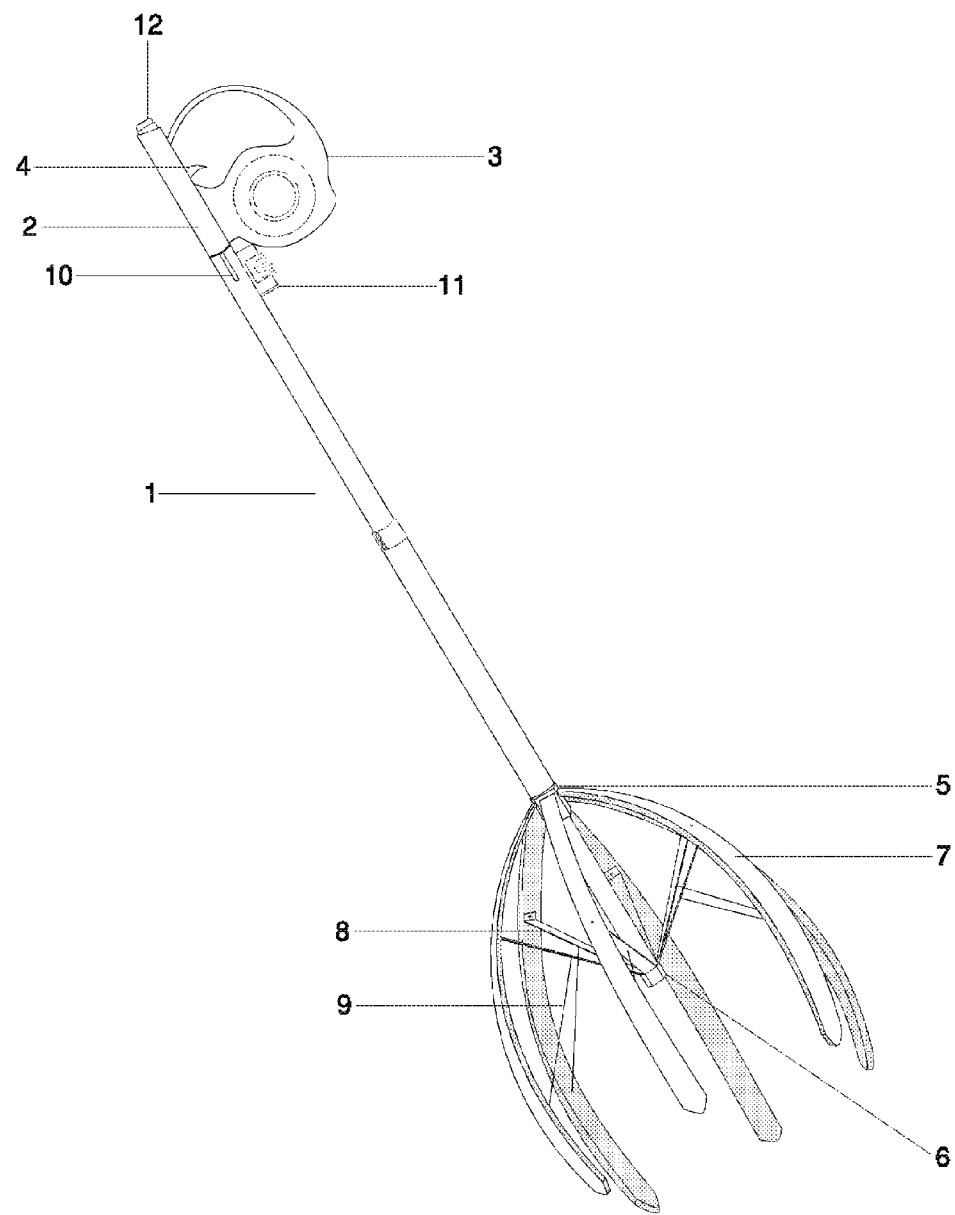

CANINE EXCREMENT COLLECTOR

CROSS REFERENCE TO RELATED APPLICATIONS

This application is a national phase application of the PCT international application number PCT/ES2013/070278 titled "Canine Excrement Collector", filed in the Spanish Patent and Trademark Office as the Receiving Office on 4 May 2013, which claims priority to and the benefit of application number U201230492 titled "Canine Excrement Collector", filed in the Spanish Patent and Trademark Office on 7 May 2012. The specification of the above referenced patent application is incorporated herein by reference in its entirety.

BACKGROUND OF THE INVENTION

At present, there are many homes with pets, for example, dogs. Having pets includes responsibilities such as maintenance of hygienic conditions for both the pet owners' well-being and respect for others. In this regard, a major problem has been the collection of canine excrement. The traditional way of collection is manual, through which, the pet owner collects the excrement from the ground, aided by a bag in which the pet owner's hand is sheathed to prevent direct contact with the excrement. This method has a number of disadvantages such as the need for a person to descend to the ground level to pick up the excrement, which may cause discomfort in the back, legs, arms, etc., especially in individuals with back injuries or elderly people. This operation also raises certain qualms in many owners because the bags, usually of a very thin plastic, allow perceiving the texture of the excrement, which makes the manual collection of excrement unpleasant. Moreover, municipal health and hygiene regulations are becoming increasingly demanding regarding this issue, and impose significant sanctions on pet owners who violate their obligations to properly collect canine waste.

In the state of the art, some documents related to the invention in question were found; although, none of these documents provides the same advantageous features or effectively resolves the existing shortcomings.

Document ES 1047944 U discloses a canine excrement collector specially designed for the collection of canine excrements before they reach the ground, during a bowel movement of the animal. This canine excrement collector includes a mast having one of its ends rounded off in a ring fitted with a means for fixing the mouth of a collection bag for excrements. The length of the mast is such that, in an upright position, the user of the scooper can place the ring with the collecting bag under the hindquarters of the animal. The disadvantage presented by the invention disclosed in document ES 1047944 U is that it is not as convenient to use as the invention disclosed herein, since the invention disclosed herein has a more advanced, yet simple system, both in the collection of objects and in the control from the handle.

Furthermore, Document ES 1062044 U discloses an extensible strap provided with an incorporated excrement collector of the type that comprises a casing with a handle; there is a drum on the inside of the casing for collecting and dispensing a strap through a frontal opening. This strap has in its free end, a hook or other means of attachment to the collar of the dog. The casing has a means for fixing a tubular body of the excrement collector. This tubular body has a flexible string or the like housed inside. One end of the flexible string emerges from the orifice of a terminal of the front end of the tubular body and is fixed to a point of the outside of the above mentioned terminal for the formation of a loop by the tension of the flexible string itself; an inverted bag being arranged in this loop. The other end of the flexible string emerges from the opposite end of the tubular body and is related to a handle on the end of the telescopic sections. The telescopic sections are housed within the tubular body. The flexible string is operationally suitable for the strangulation of the bag, so that by stretching the handle of the free end of the flexible string, the mouth of the bag is closed over the excrement, thereby picking the excrement up into the bag. This invention has the disadvantage of leaving many doubts as to the effectiveness of the collection system.

Furthermore, Document ES 1 073 603 U discloses a set of elements for the collection of canine excrement. The set of elements includes a telescopic mast equipped at its upper end with a handle or a grip, while at its opposite end, the telescopic mast is attached jointly to a receptacle. The container disclosed in the document ES 1 073 603 U is formed from a pair of rectangular pipe bowls opposing each other in the form of a receiving mouth, hinged at one of its ends by a horizontal axis. This invention provides a less efficient system than the invention disclosed herein by not having catch pins or any incorporated system that facilitates the collection of canine excrement.

Thus, there is no known collector that solves the above mentioned drawbacks, both in terms of the documents cited above and the other inventions or traditional collectors found in the state of the art.

SUMMARY OF THE INVENTION

The invention disclosed herein fully and satisfactorily solves the aforementioned problems by providing a number of advantageous and novel features, without any loss of its benefits in other aspects. The invention disclosed herein aims to provide an economic, ecological, practical, simple and easy to use solution for collection of canine excrement, that avoids unpleasant actions, facilitates the work of animal owners, and facilitates compliance with municipal guidelines, without any negative, economic, or health impact on the user. The invention has its field of application in the sector of devices intended to be used with animals, and more specifically for canine excrement pickers.

The invention disclosed, referred herein as a "canine excrement collector", is a mechanical device designed for the collection of canine excrement. The purpose of the canine excrement collector is to provide a solution to several drawbacks discussed above. The canine excrement collector disclosed herein is intended to achieve an end result that allows a more agile, quick and hygienic collection of excrements. The canine excrement collector provides essential features of novelty and notable advantages over known means used for the same purposes in the current state of the art.

The canine excrement collector consists of the following elements: a telescopic mast with a handle and a leash at the upper end of the telescopic mast. At the upper end of the telescopic mast, there is also a trigger that is internally attached to a retractable pulley, and this in turn is connected to a cord whose free end extends longitudinally inside the telescopic mast, passing through a second pulley connected to a floating hexagonal piece, and reaching a fixed hexagonal piece located at the lower end of the telescopic mast. The ends of six flexible or articulated catch pins are attached with a hinge to the floating hexagonal piece. The fixed hexagonal piece is tangentially provided with six platens, whose opposite ends are attached to the relatively central area of the catch pins, opening or guiding them, with each platen attached by a cord to the bottom end of its corresponding catch pin. In the upper area of the telescopic mast, there is a retaining clip for bags and a cartridge bag dispenser with an outlet mouth and handle flaps. The bags are biodegradable and fully coated with absorbent paper. The absorbent paper is detachably fixed to the bags to allow the absorbent paper to be easily removed from the bags. At the upper end of the telescopic mast, there is a push button that acts on the catch pins for unfolding them for their use.

Taking into consideration the above mentioned references and having analyzed the conjugated arguments with the invention disclosed herein, there are many differentiating features in the present invention, where a number of developments are provided with their corresponding advantages below.

In particular:

A device that allows the collection of droppings without any contact with hands is achieved.

Full control of the process is achieved from the handle.

The catch pins enable a quick and effective use of the device.

It is a mechanical device that does not require electric power or the use of any consumables.

It is a simple and inexpensive product.

It is easy to carry.

It is easy and convenient to use.

BRIEF DESCRIPTION OF THE DRAWINGS

For a better understanding of the invention disclosed herein, a drawing is provided that by way of a non-limiting example, describes an embodiment of the invention.

FIG. 1 exemplarily illustrates a perspective of the invention.

DETAILED DESCRIPTION OF THE INVENTION

In FIG. 1, the following numbered items are shown:
1. Telescopic mast
2. Handle
3. Leash
4. Trigger
5. Floating hexagonal piece
6. Fixed hexagonal piece
7. Catch pins
8. Platen
9. Cords
10. Retaining clip
11. Cartridge bag dispenser
12. Push button An embodiment of the invention disclosed herein consists of the following elements: a telescopic mast (1) with a handle (2) and a leash (3) provided at the upper end of the telescopic mast (1). In the upper end of the telescopic mast (1), there is also a trigger (4) that is internally attached to a retractable pulley, and this in turn is connected to a cord whose free end extends longitudinally inside the telescopic mast (1), passing through a second pulley connected to a floating hexagonal piece (5), and reaching a fixed hexagonal piece (6) located at the lower end of the telescopic mast (1). The ends of six flexible or articulated catch pins (7) are attached with a hinge to the floating hexagonal piece (5). The fixed hexagonal piece (6) is tangentially provided with six platens (8), whose opposite ends are attached to the relatively central area of the catch pins (7) for opening or guiding the catch pins (7), while each platen (8) is attached by a cord (9) to the bottom end of its corresponding catch pin. In the upper area of the telescopic mast (1), there is a retaining clip (10) for bags and a cartridge bag dispenser (11) with an outlet mouth and handle flaps; these bags are biodegradable and fully coated with absorbent paper. The absorbent paper is detachably fixed to the bags to allow the absorbent paper to be easily removed from the bags. At the upper end of the telescopic mast (1), there is a push button (12) that acts on the catch pins (7) to unfold them for their use.

In a different embodiment, the catch pins (7) are covered by a waterproof fabric. Alternatively, the system presents a biodegradable bag with rubber in the middle part of the telescopic mast (1). The biodegradable bag is closed by laces at the top and designed to substantially cover the device.

The process for using the device is as follows: a) a bag is removed from the cartridge bag dispenser (11); b) the bag is placed on the catch pins (7) of the telescopic mast (1) in a folded position, introducing the bottom part of the telescopic mast (1) into the bag, holding the top edges of the bag with the retaining clip (10), and ensuring that the bag does not come off; c) to unfold the telescopic mast (1), the push button (12) is activated; pressing the push button (12) fully extends the three telescopic sections that make up the telescopic mast (1), and the catch pins (7) open with the bag covering the catch pins (7) externally; d) with the device in this configuration, the catch pins (7) are placed on the excrement to be picked up; e) with the catch pins (7) on the excrement, the action trigger (4) is activated to close the catch pins (7); e) the closing of the catch pins (7) occurs when a cable that runs through the telescopic mast (1) is drawn taut, driving the floating hexagonal piece (5) up, that with its rise, pulls the platens (8), which, in turn, pull the collecting cords (9) connected to the catch pins (7), that as the cords (9) go up, make the catch pins (7) close; f) when closing the catch pins (7), the droppings are collected, leaving the content inside the bag; g) when the bag covering the catch pins (7) is removed, the trigger (4) is released and the excrement is collected in the bag.

We claim:

1. A canine excrement collector consisting of:
   a telescopic mast with a handle;
   a leash provided at an upper end of said telescopic mast;
   a trigger positioned at said upper end of said telescopic mast, said trigger internally attached to a retractable pulley;
   said retractable pulley connected to a cord whose free end extends longitudinally inside said telescopic mast, passing through a second pulley connected to a floating hexagonal piece, and reaching a fixed hexagonal piece located at a lower end of said telescopic mast;
   catch pins having ends attached to said floating hexagonal piece via a hinge; and
   platens extending from said fixed hexagonal piece, wherein opposite ends of said platens are attached to central areas of said catch pins for one of opening and guiding said catch pins, and wherein each of said platens is attached by a cord to a bottom end of a corresponding one of said catch pins.

2. The canine excrement collector of claim 1, further consisting of a push button positioned in an upper area of said telescopic mast and operably connected to said catch pins, wherein said push button is configured to unfold and fold said catch pins.

3. The canine excrement collector of claim 1, wherein said catch pins are one of flexible catch pins and articulated catch pins.

4. The canine excrement collector of claim 1, wherein said catch pins are covered by a waterproof fabric.

5. The canine excrement collector of claim 1, further consisting of a retaining clip positioned in an upper area of said telescopic mast, wherein said retaining clip is configured to retain bags, said bags being biodegradable and fully coated with absorbent paper.

6. The canine excrement collector of claim 1, further consisting of a cartridge bag dispenser with an outlet mouth and handle flaps positioned in an upper area of said telescopic mast.

7. The canine excrement collector of claim 1, further consisting of a biodegradable bag with rubber positioned in a middle part of said telescopic mast and closed by laces at the top of said biodegradable bag to substantially cover said canine excrement collector.

\* \* \* \* \*